UNITED STATES PATENT OFFICE.

HUGO GALLINOWSKY, OF ROCHESTER, NEW YORK, ASSIGNOR OF ONE-HALF TO HENRY L. BECKER, OF SAME PLACE.

COMPOSITION OF MATTER FOR THE PRODUCTION OF ARTIFICIAL SCHOOL-SLATES, &c.

SPECIFICATION forming part of Letters Patent No. 401,427, dated April 16, 1889.

Application filed January 30, 1889. Serial No. 298,089. (No specimens.)

*To all whom it may concern:*

Be it known that I, HUGO GALLINOWSKY, of Rochester, in the county of Monroe and State of New York, have invented a certain new and useful Improvement in Composition of Matter for the Production of Artificial School-Slates, &c.; and I do hereby declare that the following is a full, clear, and exact description of the same.

My improvement relates to a composition of matter for coating a flat surface to form school-slates and blackboards and for other purposes, the design being to provide a cheap and substantial substitute for the natural stone in common use. The formula is as follows: muriatic acid, one-half pound; water, three ounces; burnt magnesia, four ounces; white bone-ash, one-half ounce; mineral flour, (such as marble-dust or quartz-dust,) one-half ounce; pumice-stone dust, one-half ounce. To this may be added, if desired, one-half ounce of oyster or clam shell powder. These materials are mixed and thoroughly agitated and allowed to stand till the acid has become thoroughly incorporated. Two ounces more of magnesia are then added to form a cement, in which condition the material is ready for use.

Sheet straw-board or any other suitable flat material is used for the backing. The compound is spread thinly on both sides by a suitable brush to form the initial coating. More magnesia is then added to the compound to thicken it, and it is spread on the back-ing in a heavier body to produce the finishing-surface. The sheets are allowed to stand an hour to harden, and are then placed alternately between smooth hard-rubber plates and subjected to pressure in a suitable press. They are then removed and placed between glass plates to keep air from the surface and allowed to remain a day or two till they solidify. They may be made of all sizes for school-slates and blackboards and may be framed or not, as desired. They present a hard and smooth surface impervious to water and having great strength and toughness. The composition of matter above described may be used for various other purposes, such as letters for signs, &c. The proportions of the ingredients may be varied more or less, as circumstances may require.

Having described my invention, what I claim as new, and desire to secure by Letters Patent, is—

The composition of matter herein described, consisting of muriatic acid, water, burnt magnesia, white bone-ash, mineral flour, and pumice-stone flour, in proportions substantially as named, and for the purposes specified.

In witness whereof I have hereunto signed my name in the presence of two subscribing witnesses.

HUGO GALLINOWSKY.

Witnesses:
R. F. OSGOOD,
P. A. COSTICH.